(12) United States Patent
Mor (10) Patent No.: US 6,973,049 B2
(45) Date of Patent: Dec. 6, 2005

(54) AUTO-CONFIGURATION OF NETWORK INTERFACES IN A BIDIRECTIONAL RING NETWORK

(75) Inventor: Gal Mor, Rishon Lezion (IL)

(73) Assignee: Corrigent Systems Ltd., Tel Aviv (IL)

( * ) Notice: Subject to any disclaimer, the term of this patent is extended or adjusted under 35 U.S.C. 154(b) by 955 days.

(21) Appl. No.: 09/978,642

(22) Filed: Oct. 16, 2001

(65) Prior Publication Data

US 2003/0072259 A1    Apr. 17, 2003

(51) Int. Cl.[7] .............................................. H04L 12/42
(52) U.S. Cl. ...................................... 370/258; 370/254
(58) Field of Search ................................ 370/254, 255, 370/258, 248

(56) References Cited

U.S. PATENT DOCUMENTS

| | | | | |
|---|---|---|---|---|
| 4,615,029 A | * | 9/1986 | Hu et al. ..................... | 370/449 |
| 5,546,542 A | * | 8/1996 | Cosares et al. ............. | 709/241 |
| 5,920,267 A | * | 7/1999 | Tattersall et al. ........... | 370/258 |
| 5,949,754 A | * | 9/1999 | Takahashi ................... | 370/222 |
| 6,304,557 B1 | * | 10/2001 | Nakazumi ................... | 370/258 |
| 6,400,682 B1 | * | 6/2002 | Regula ........................ | 370/223 |
| 6,785,224 B2 | * | 8/2004 | Uematsu et al. ............. | 370/222 |
| 2004/0190461 A1 | * | 9/2004 | Gullicksen et al. ......... | 370/258 |

OTHER PUBLICATIONS

Harrera et al., "A Framework for IP over Packet Transport Rings", Internet Draft, draft-ietf-ipoptr-framework-00, Jun. 2001.

D. Tsiang et al., Request for Comments (RFC) 2892 of the Internet Engineering Task Force (IETF), Aug. 2000.

* cited by examiner

Primary Examiner—Min Jung
(74) Attorney, Agent, or Firm—Ladas and Parry LLP (57) ABSTRACT

A method for configuration of a node inserted into a bidirectional ring network includes, responsive to traffic on first and second rings of the network, determining at the node that one of the first and second rings carries the traffic in a clockwise direction around the network, while the other of the rings carries the traffic in a counterclockwise direction. The node then sends and receives advertisement packets through its network interfaces over the respective rings, advertising the determined directions of the traffic carried by the rings. Responsive to the advertisement packets received at the node, the configuration of the node is completed so that the traffic can be sent to and from the node on the first and second rings in the determined directions.

34 Claims, 4 Drawing Sheets

AUTO-CONFIGURATION OF NETWORK INTERFACES IN A BIDIRECTIONAL RING NETWORK

FIELD OF THE INVENTION

The present invention relates generally to high-speed data communications, and specifically to communication protocols for use in bidirectional ring networks.

BACKGROUND OF THE INVENTION

Network ring topologies are gaining in popularity, particularly in Internet Protocol (IP) networks. Such networks enable carriers to offer large bandwidth to users in a cost-effective manner, since each node in the network needs only two interfaces, rather than having to maintain a separate interface for each of the other nodes as in a mesh network. Ring networks also lend themselves to fast rerouting in the event of network failures, since two alternative routes—in clockwise and counterclockwise directions—are generally available for connecting any two nodes on the ring.

Recently-developed bidirectional protocols provide efficient bandwidth utilization by enabling data to be transferred between any pair of nodes in either direction around the ring, while maintaining fast protection against faults. The two opposing traffic directions are commonly referred to as an inner ring and an outer ring. It will be understood, however, that in the context of the present patent application and in the claims, the terms "inner" and "outer," as well as "clockwise" and "counterclockwise," are used arbitrarily to distinguish between the two opposing directions of packet flow in a ring network. These terms are chosen solely for convenience of explanation, and do not necessarily bear any relation to the physical characteristics of the network.

The leading bidirectional protocol for high-speed packet rings is the Resilient Packet Rings (RPR) protocol, which is in the process of being defined as IEEE standard 802.17. Network-layer routing over RPR is described, for example, by Jogalekar et al., in "IP over Resilient Packet Rings" (Internet Draft draft-jogalekar-iporpr-00), and by Herrera et al., in "A Framework for IP over Packet Transport Rings" (Internet Draft draft-ietf-ipoptr-framework-00). A proposed solution for Media Access Control (MAC—protocol layer 2) in bidirectional ring networks is the Spatial Reuse Protocol (SRP), which is described by Tsiang et al., in Request for Comments (RFC) 2892 of the Internet Engineering Task Force (IETF). These documents are incorporated herein by reference. They are available at www.ietf.org.

Using protocols such as these, each node in a ring network can communicate directly with all other nodes through either the inner or the outer ring. The sending node transmits the packet through either its inner ring interface or its outer ring interface, using the appropriate Media Access Control (MAC) address of the destination node. The choice of the ring on which to transmit a particular data flow is application-dependent and typically takes into consideration factors such as the number of hops to traverse in each direction and the bandwidth available on each of the rings.

When a new node is installed in a ring network, one of its network interfaces is connected to the inner ring, and the other to the outer ring, and the node must be configured so that it "knows" the ring assignments of the interface. Typically, the operator or technician who installs the node must identify the physical links as "inner" and "outer," and then manually configure the interfaces accordingly. The assignment of inner and outer rings, however, is a function solely of the RPR protocol. From a physical point of view, there is no difference between the two rings, and there are generally no external signs on the physical links to assist the operator in identifying which ring is which. An error by the operator in configuring the inner and outer interfaces will prevent the new node from operating normally in the network. The error may also interfere with the operation of other nodes, by preventing them from delivering traffic through the links that are connected to the new node.

In many networks known in the art, a master entity is appointed in the network, typically one of the nodes, which negotiates with each new node and configures its interfaces. Each new node must get its connectivity information from the master entity before it can start sending and receiving traffic normally. The RPR protocol at present does not support such a master entity. Therefore, creating a master node in a RPR network would require implementing a new, proprietary protocol, which must be fully defined and address all possible scenarios that may arise in the network during the negotiation between the master node and new nodes. Furthermore, in order to avoid failure of the entire network when the master node fails, there must be a redundant, backup master, with a suitable mirroring protocol so that the backup master always has the complete, up-to-date state of the network. In the absence of a valid, functioning master node, it will not be possible for a technician or operator to install a new node in the ring network. In view of these constraints and robustness requirements, the use of a master node to configure new nodes in a RPR network becomes an expensive, risky and unreliable proposition.

SUMMARY OF THE INVENTION

It is an object of some aspects of the present invention to provide improved bidirectional ring networks and protocols for use in such networks.

It is a further object of some aspects of the present invention to provide a method for automatically configuring the interfaces of a new node that is inserted into a bidirectional ring network, without requiring the existence of a master node on the network.

In preferred embodiments of the present invention, a new node is inserted into a bidirectional ring network, and the two network interfaces of the node are connected respectively to the two rings of the network, without necessarily knowing in advance which is the "inner" and which is the "outer" ring. The new node listens for control packets on the rings, which identify which ring is which. It then assigns its interfaces to the inner and outer rings accordingly. Alternatively, if no such control packets are received within a predetermined time period, the new node decides on the ring assignments arbitrarily.

It may occur in certain situations, such as when a ring is initially assembled or powered up, that different nodes will make conflicting decisions regarding assignment of the rings. To deal with such situations, after making its initial ring assignments, the new node enters a verification state, while awaiting confirmation of the ring assignments it has made. While the node is in the verification state, it sends out verification packets through its network interfaces over the respective rings, advertising the directions it has assigned to the rings. When a verification packet has made a complete circuit of the ring and returned to the new node, or when the new node receives a packet from another node confirming its ring assignments, the new node can conclude that its assignments are correct and can begin normal activity. On the other hand, if the new node receives a packet from another node indicating that there is a conflict, it invokes a decision protocol, obeyed by all the nodes in the network, to determine how the conflict should be resolved. In this manner, all the nodes in the network configure their own interfaces autonomously, without the need for operator intervention or for a master entity in the network.

There is therefore provided, in accordance with a preferred embodiment of the present invention, a method for configuration of a node inserted into a bidirectional ring network, after first and second network interfaces of the node are connected to respective first and second rings of the network, the method including:

responsive to traffic on the first and second rings, determining at the node that one of the first and second rings carries the traffic in a clockwise direction around the network, while the other of the rings carries the traffic in a counterclockwise direction;

sending and receiving advertisement packets through the first and second network interfaces over the respective rings, advertising the determined directions of the traffic carried by the rings; and responsive to the advertisement packets received at the node, completing the configuration of the node so that the traffic can be sent to and from the node on the first and second rings in the determined directions.

Preferably, determining that the rings carry the traffic in the clockwise and counterclockwise directions includes monitoring control packets passing the node on the first and second rings to determine the directions. Most preferably, monitoring the control packets includes reading a ring identification field in the control packets. In a preferred embodiment, monitoring the control packets includes receiving control packets that are transmitted in accordance with a Resilient Packet Ring (RPR) protocol. Further preferably, determining that the rings carry the traffic in the clockwise and counterclockwise directions includes, when the control packets are not received at the node within a predetermined timeout period, selecting the directions autonomously at the node.

Preferably, sending and receiving the advertisement packets includes putting the node in a verification state, in which it is not permitted to send or receive the traffic other than the advertisement packets, until the configuration of the node is completed. Additionally or alternatively, completing the configuration includes sending further advertisement packets indicating that the node has entered a normal state in which the traffic can be sent to and from the node on the first and second rings in the determined directions.

Typically, receiving the advertisement packets includes receiving one of the advertisement packets sent by the node itself, after the one of the advertisement packets has made a complete circuit of one of the rings.

Alternatively, assuming the node to be a first node among a plurality of nodes in the network, receiving the advertisement packets may include receiving an incoming advertisement packet sent by a second node among the nodes in the network. Preferably, completing the configuration includes, when the incoming advertisement packet advertises directions of the traffic carried by the rings that are different from the directions determined at the first node, deciding whether to configure the interfaces according to the directions determined at the first node or the directions advertised by the second node, so that the interfaces at both the first and second nodes are configured according to the same directions. Most preferably, each of the nodes in the network has a unique identification parameter, and deciding whether to configure the interfaces includes determining the configuration responsive to a comparison of the unique identification parameters of the first and second nodes.

Preferably, receiving the incoming advertisement packet includes, upon deciding to configure the interfaces according to the directions determined at the first node, discarding the incoming advertisement packet. Alternatively, receiving the incoming advertisement packet includes, upon deciding to configure the interfaces according to the directions determined at the first node, modifying the incoming advertisement packet so that it advertises the directions determined at the first node, and forwarding the modified packet around the network.

There is also provided, in accordance with a preferred embodiment of the present invention, a method for configuration of a first node inserted into a bidirectional ring network, after first and second network interfaces of the first node are connected to respective first and second rings of the network, the method including:

selecting at the first node one of the first and second rings to carry the traffic in a clockwise direction around the network, while selecting the other of the rings to carry the traffic in a counterclockwise direction;

sending an outgoing advertisement packet from the first node through at least one of the first and second network interfaces over the respective ring, advertising the selected directions of the traffic carried by the rings and specifying a unique identification parameter of the first node;

receiving an incoming advertisement packet at the first node from a second node in the network, in which the advertised directions of the traffic carried by the rings differ from the selected directions, the incoming advertisement packet specifying the unique identification parameter of the second node; and responsive to a comparison of the unique identification parameters of the first and second nodes, deciding whether to configure the interfaces of the first node according to the directions selected by the first node or the directions advertised by the second node.

Preferably, the unique identification parameters of the first and second nodes include respective network addresses of the nodes. Alternatively or additionally, the unique identification parameters of the first and second nodes include respective random numbers selected by the nodes. Further additionally or alternatively, deciding to configure the interfaces includes choosing the directions according to which of the first and second nodes has a lesser value of the unique identification parameter.

There is additionally provided, in accordance with a preferred embodiment of the present invention, a communication device, for operation as a node in a bidirectional ring network, the device including:

first and second network interfaces, which are adapted to be connected to respective first and second rings of the network; and a traffic processor, coupled to the first and second network interfaces, which is adapted, responsive to traffic on the first and second rings, to determine that one of the first and second rings carries the traffic in a clockwise direction around the network, while the other of the rings carries the traffic in a counterclockwise direction, and which is further adapted to send and receive advertisement packets through the first and second network interfaces over the respective rings, advertising the determined directions of the traffic carried by the rings, and responsive to the advertisement packets received at the interfaces, to complete the configuration of the node so that the traffic can be sent to and from the node on the first and second rings in the determined directions.

There is further provided, in accordance with a preferred embodiment of the present invention, a communication device, for operation as a first node in a bidirectional ring network, the device including:

first and second network interfaces, which are adapted to be connected to respective first and second rings of the network; and a traffic processor, coupled to the first and second network interfaces, which is adapted to select one of the first and second rings to carry the traffic in a clockwise direction around the network, while selecting the other of the rings to carry the traffic in a counterclockwise direction, and which is further adapted to send an outgoing advertisement packet through at least one of the first and second network interfaces over the respective ring, advertising the selected directions of the traffic carried by the rings and specifying a unique identification parameter of the first node, and to receive an incoming advertisement packet through one of the first and second interfaces from a second node in the network, in which the advertised directions of the traffic carried by the rings differ from the selected directions, the incoming advertisement packet specifying the unique identification parameter of the second node, and which is adapted, responsive to a comparison of the unique identification parameters of the first and second nodes, to decide whether to configure the interfaces of the first node according to the directions selected by the first node or the directions advertised by the second node.

The present invention will be more fully understood from the following detailed description of the preferred embodiments thereof, taken together with the drawings in which:

DETAILED DESCRIPTION OF PREFERRED EMBODIMENTS

Figure 1:
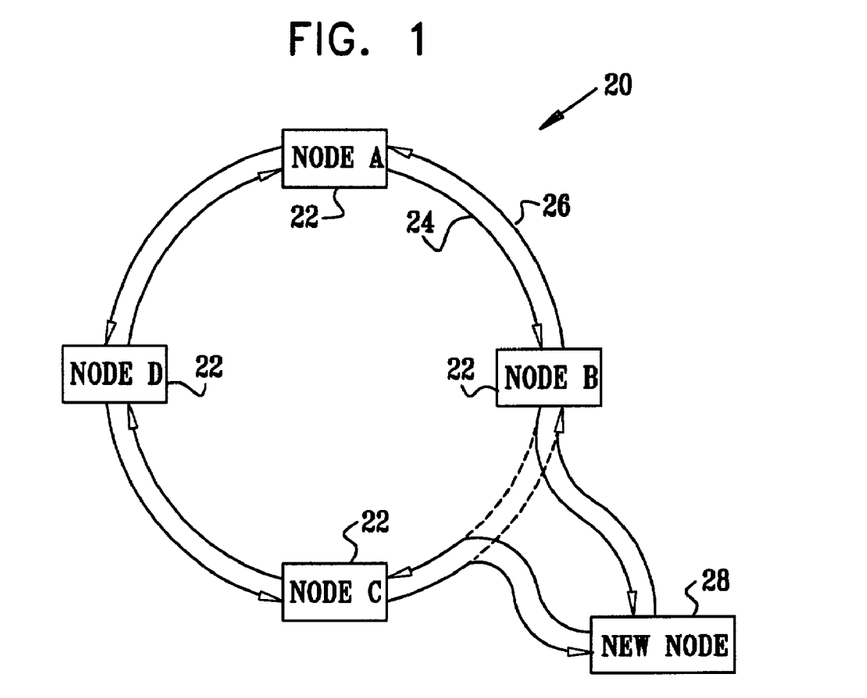
FIG. 1 is a block diagram that schematically illustrates insertion of a new node into a bidirectional ring network, in accordance with a preferred embodiment of the present invention.

FIG. 1 is a block diagram that schematically shows a packet ring network 20, in accordance with a preferred embodiment of the present invention. Network 20 comprises nodes 22, marked NODE A through NODE D, which are mutually connected by bidirectional communication media, such as optical fibers or conductive wires. The nodes typically comprise switching equipment, and serve as either access points or gateways to other networks (aggregation points). The communication media and nodes in network 20 are configured to define an inner ring 24, over which packets are conveyed between the nodes in a clockwise direction, and an outer ring 26, over which the packets are conveyed in a counterclockwise direction. As noted above, however, the designations of "inner," "outer," "clockwise" and "counterclockwise" are arbitrary and are used here simply for convenience and clarity of explanation. Furthermore, the designation and number of nodes in network 20 are chosen here by way of example, and the network may, by the same token, comprise a greater or smaller number of nodes.

Nodes 22 exchange both data and control packets on rings 24 and 26, preferably in the framework of the above-mentioned RPR protocol. For example, the Spatial Reuse Protocol (SRP) described in the above-mentioned RFC 2892 (chapter 4) specifies that nodes in the network exchange control packets known as Usage Messages and Intelligent Protection Switching (IPS) Messages. The control packets are passed between adjacent nodes in order to manage the network, both during normal operation and when failures occur. These packets typically indicate whether they belong to the inner or outer ring, using a flag such as the Ring Identifier (RI) bit specified in RFC 2892, for example.

At a point in time illustrated in FIG. 1, a new node 28 is introduced into network 20 between nodes B and C. For this purpose, the segments of rings 24 and 26 between nodes B and C are opened and are then connected through the network interfaces of the new node. Typically, rings 24 and 26 bear no external signs identifying them as the "inner" and "outer" rings. Rather, the operator installing the new node connects the network interfaces arbitrarily, and node 28 then configures itself automatically, as described hereinbelow.

Figure 2:
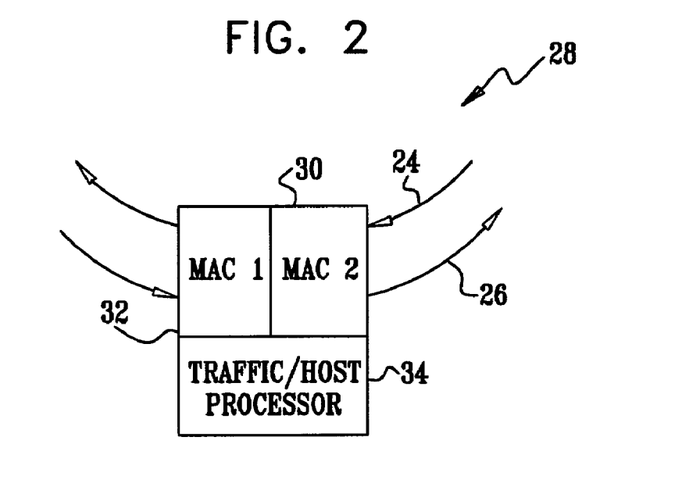
FIG. 2 is a block diagram that schematically shows details of a node in the network of FIG. 1, in accordance with a preferred embodiment of the present invention.

FIG. 2 is a block diagram that schematically shows details of new node 28, in accordance with a preferred embodiment of the present invention. (Existing nodes 22 have a similar structure.) Node 28 comprises media access control (MAC) interface blocks 30 and 32, which are connected to transmit and receive data on the "east" and "west" sides of node 28, respectively. In other words, as shown in the figure, block 30 receives data on ring 24 and transmits data on ring 26, while block 32 receives data on ring 26 and transmits data on ring 24. Like the terms "inner" and "outer," the assignment of "east" and "west" directions in the context of the present patent application is arbitrary, and these terms are used solely for convenience of explanation. Other MAC block configurations may also be used. Typically, each of MAC blocks 30 and 32 has its own MAC address (signified in FIG. 2 by the titles "MAC1" and "MAC2"). Alternatively, the two blocks may share a common address.

MAC blocks 30 and 32 are responsible for ring management and perform the MAC-layer functions of capturing packets that are addressed to node 28 on the respective rings, while passing all other traffic through to the next node along the ring. The MAC blocks also capture point-to-point control packets, such as the above-mentioned IPS and Usage packets, which do not carry specific destination MAC addresses. Preferably, blocks 30 and 32 operate in accordance with the RPR protocol described in the Background of the Invention, or with another, similar bidirectional protocol. The basic ring protocol is augmented by an auto-configuration protocol, described in detail hereinbelow, which enables the nodes to determine which of rings 24 and 26 is connected to each of blocks 30 and 32, and to configure the network interfaces of the blocks accordingly.

When one of MAC blocks 30 and 32 captures a packet addressed to its own node 28, it typically delivers the packet to a traffic processing block 34 of the node. (Some control packets, however, are preferably processed by the MAC blocks themselves and are not delivered to block 34.) Block 34 preferably comprises a dedicated traffic processing chip or chip set, along with a general-purpose host processor, although other hardware and software configurations may also be used. The traffic processing block is responsible for upper layer functions, such as Ethernet, label switching, IP processing, and optionally other higher-level operations, such as Quality of Service (QoS) and network security. In a node that serves as an access point, for example, block 34 is typically responsible for delivery of packets to users who are connected to network 20 through the node and for receiving packets from the users for transmission over network 20. In addition, block 34 preferably manages the interface configuration of MAC blocks 30 and 32 using the auto-configuration protocol described below.

Figure 3A:
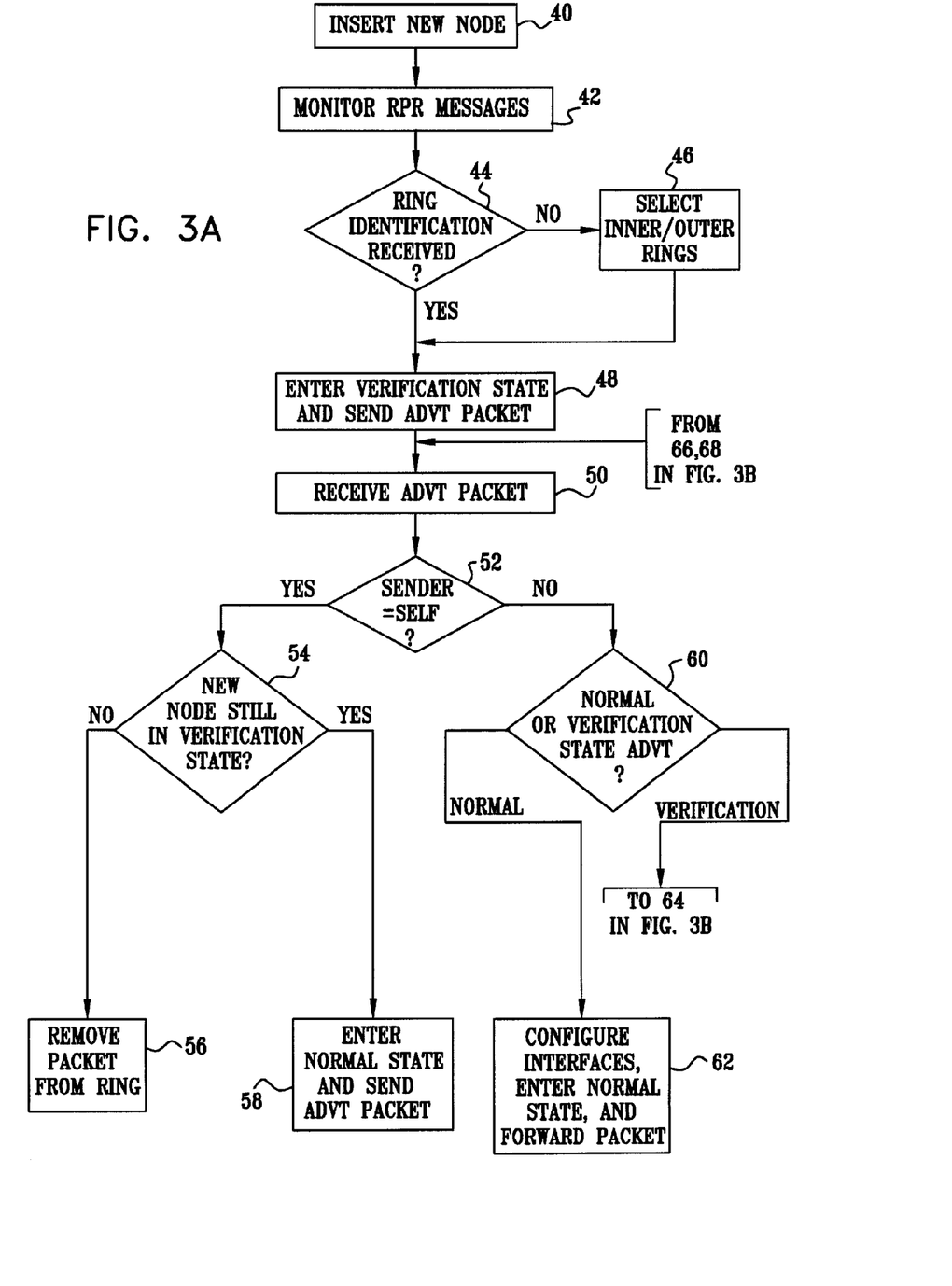
FIGS. 3A and 3B are flow charts that schematically illustrate a method for configuring network interfaces of a node in a ring network, in accordance with a preferred embodiment of the present invention.
Figure 3B:
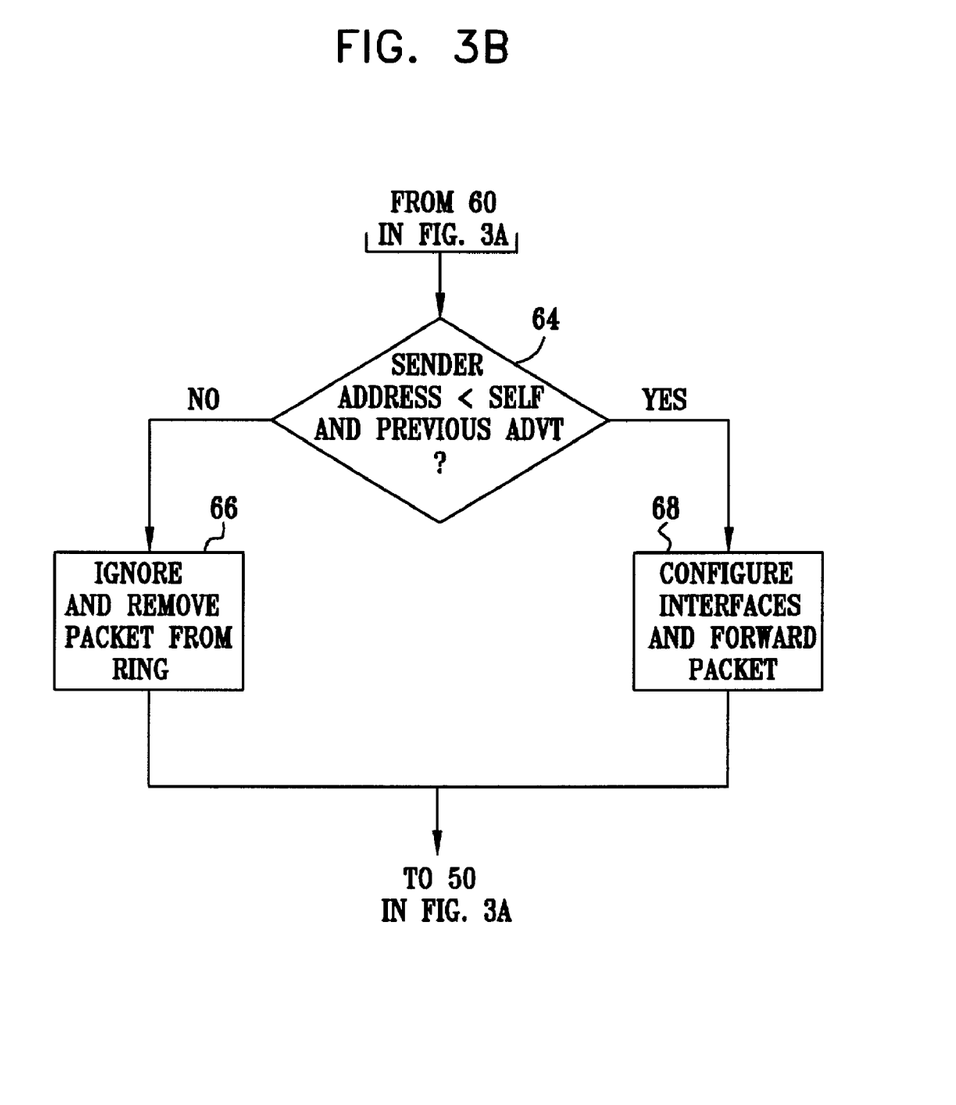

FIGS. 3A and 3B are flow charts that schematically illustrate a method for auto-configuration of new node 28, in accordance with a preferred embodiment of the present invention. This method is invoked upon installation of the new node in network 20, at an installation step 40. A special case of such installation, which is also handled by the present method, is start-up of a new network or initial power-up of an existing network. The new node does not initially know which of rings 24 and 26 is the inner ring, and which is the outer ring. It therefore enters a "listening mode," in which it monitors the traffic on both rings, at a monitoring step 42. While in the listening mode, node 28 neither sends packets on ring 24 or 26, nor does it remove or modify any packets on the rings. Rather, it waits for control packets that are tagged with an identification of the ring on which they are traveling, such as the RI bit in SRP Usage and IPS messages mentioned above. While waiting to learn the identities of rings 24 and 26, new node 28 passes all traffic transparently through to its neighboring nodes, so that nodes 22 already operating in network 20 are substantially unaffected by the learning process carried out by the new node.

The listening phase of the learning process ends when new node 28 has received control packets on both of rings 24 and 26, identifying the inner and outer rings, at an identification reception step 44. At this point, node 28 verifies that one of the rings has been identified as the inner ring, and the other as the outer ring. If both rings have the same identification, node 28 concludes that an error has occurred, and returns to step 42. As long as the identifications are different, node 28 advances to a verification step 48.

It may occur, however, that node 28 does not receive the expected control packets within a given time limit. This situation will arise particularly when network 20 has just been installed or powered up. Preferably, node 28 waits at step 44 for a time at least equal to a specified timeout period that is set for RPR control packets. When such a timeout occurs, node 28 makes its own decision as to the identification of rings 24 and 26, at a ring selection step 46. Since rings 24 and 26 are symmetrical, the selection of the inner and outer rings can be arbitrary, or can be set to a default configuration (for example, as shown in FIG. 2, west side= inner ring transmitter and outer ring receiver, east side=outer ring transmitter and inner ring receiver) The first node installed in network 20 is therefore free to choose the ring assignments. A problem will arise only when two or more nodes are powered up at once, in which case two different nodes may make conflicting selections at step 46.

In order to ensure that its selection or identification of the inner and outer rings does not cause any conflicts, new node 28 enters a verification state, at a verification step 48. Upon entering this state, the node sends advertisement packets on both of rings 24 and 26, specifying its assignment of the inner and outer rings, as well as its current state (verification) and its MAC address. It then waits to receive advertisement packets back from the rings, at an advertisement reception step 50, before transferring on to normal state and beginning to send and receive data traffic. When a node in listening mode (step 42) receives an advertisement packet from another node, it treats the packet as a control message for the purpose of identifying the inner or outer ring at step 44, and then enters the verification state itself at step 48. Preferably, when a node in the verification state receives a RPR control message while waiting for an advertisement packet at step 50, it checks the message to make sure that the ring identification corresponds to its own and, if it does not, the node returns to the listening mode at step 42.

The advertisement packet that node 28 in verification state receives at step 50 may be one that it originally sent itself, or it may be an advertisement packet from another node that was powered up at about the same time. The node checks the sender address of the advertisement packet, at a sender checking step 52. In the situation shown in FIG. 1, in which new node 28 is installed in an existing ring, only node 28 among nodes 22 on the ring is typically in the verification state. In this case, the new node recognizes the sender address of the advertisement packet as its own address at step 52, and ascertains that it is still in the verification state when it receives the advertisement packet, at a state determination step 54. At this point, the node removes the advertisement packet from the ring and enters the normal state, at a normal state initiation step 58. It then sends further advertisement packets on both of rings 24 and 26, specifying its assignment of the ring directions, its current state (normal) and its MAC address. The normal state advertisement packets signal to other nodes 22 that node 28 is now prepared to send and receive normal data traffic.

It may also occur that between the time new node 28 in verification state has sent its advertisement packets, and the time one of these packets has made a full circuit of ring 24 or 26 back to node 28 at step 52, the new node has completed its verification procedure and finds itself to be in the normal state at step 54. This situation can arise when multiple nodes are in the verification state at overlapping times, as described further hereinbelow, or when the node now in the normal state previously sent multiple advertisement packets while it was in the verification state. In this case, node 28 in normal state simply removes its verification advertisement packet from the ring, at a packet removal step 56, and continues with its normal operation.

When multiple nodes are in the verification state at overlapping times, node 28 may find at step 52 that the advertisement packet it received at step 50 was sent by another of the nodes in network 20. In this case, node 28 has to determine, at an advertisement type checking step 60, whether the advertisement packet is a verification node advertisement (sent by the other node at its own step 48), or whether it is a normal state advertisement (sent by the other node at its own step 58). If the packet is a normal state advertisement, it means that the other node, which sent the packet, has already completed and verified its own ring assignments. Therefore, node 28 simply terminates its own verification procedure and accepts the other node's assignments, at an acceptance step 62. Node 28 configures its interfaces based on the advertised assignments, enters the normal state and forwards the normal state advertisement packet on around the ring. Optionally, node 28 also sends out its own normal state advertisement packets.

When at step 60, node 28 determines that the advertisement packet it has received is a verification advertisement sent by another node, its must decide whether to adopt the ring assignment set by the other node, or to ignore the advertisement and stick by its own ring assignment. When there is a conflict between the ring assignments set by different nodes in the verification node, the conflict is preferably decided in favor of the node with the lowest MAC address. Alternatively, the protocol may be configured so that the higher MAC address prevails, or some other unambiguous decision criterion may be used. Typically, the MAC address of each MAC block 30 and 32 (or the common address of the two MAC blocks together) is preset in hardware to a unique value, or is determined automatically by some other initialization mechanism at power-up of network 20. If this is not the case, each of the nodes in the network preferably generates a random number between zero and some large value (for example, $2^{32}$), and this number is used in deciding which node receives priority when a conflict occurs in the ring assignments. Alternatively, other criteria for conflict resolution among the nodes may be used, as will be apparent to those skilled in the art.

Thus, after determining at step 60 that it has received a verification advertisement packet from another node, new node 28 preferably checks the sender address of the advertisement packet, at a sender evaluation step 64. If the sender address is greater than the address of node 28 itself or is greater than the sender address in another verification advertisement packet that node 28 received previously, node 28 concludes that the ring assignments advertised by this packet can be ignored, at a packet disregard step 66. Node 28 preferably removes the advertisement packet from the ring and does not forward it to the remaining nodes. Alternatively, node 28 may forward the packet after having updated it with its own sender address and ring assignments. Whether it removes the packet or modifies and forwards it at step 66, node 28 remains in the verification step and waits to receive the next advertisement packet at step 50.

On the other hand, if node 28 determines at step 64 that the sender address of the verification advertisement packet is lower than its own address and lower than the sender addresses of all previous verification advertisement packets that it has received, node 28 will adopt the ring assignments indicated by this packet, at a configuration adoption step 68. Node 28 configures its own interfaces accordingly, and forwards the verification packet on around the ring. The node remains in the verification state, and waits to receive the next advertisement packet at step 50. Node 28 finally enters the normal state only after it has received its own verification advertisement packet back after a full circuit of the appropriate ring, or until it receives a normal mode advertisement packet from another node.

Figure 4:
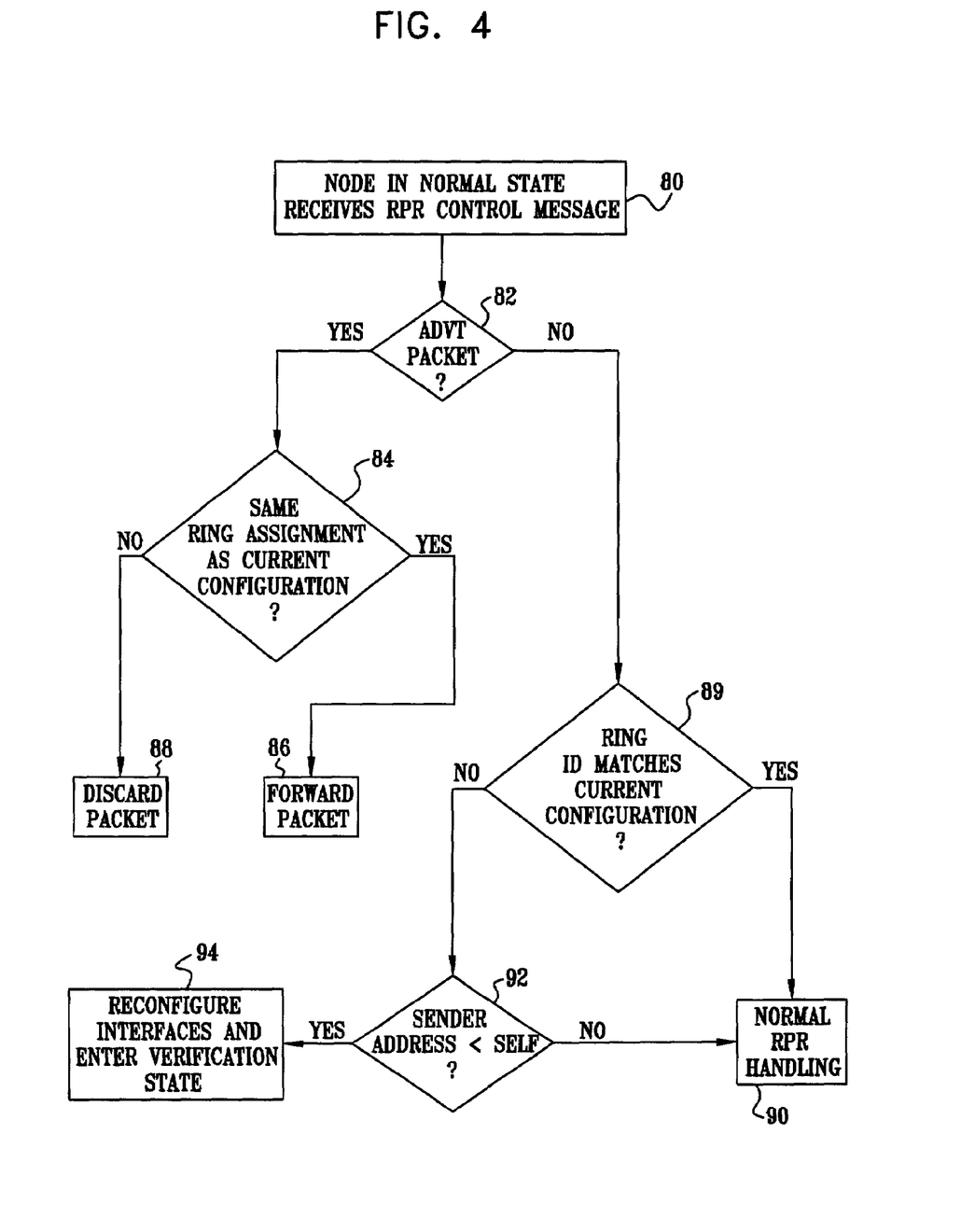
FIG. 4 is a flow chart that schematically illustrates a method for handling control messages in a ring network, in accordance with a preferred embodiment of the present invention.

FIG. 4 is a flow chart that schematically illustrates a method by which nodes 22 and 28 while in normal state handle control messages on rings 24 and 26, in accordance with a preferred embodiment of the present invention. The method described here applies to RPR control messages generally that are received by the nodes in normal state, at a message reception step 80. These may be special configuration advertisement packets, sent as described above at step 48 or step 58, or they may alternatively be RPR control messages of substantially any other type.

The node receiving a RPR message examines the message to determine whether or not it is an advertisement packet, at an advertisement checking step 82. If this is an advertisement packet sent by another one of the nodes, the receiving node checks whether the ring assignments advertised by this packet correspond correctly to the configuration of the receiving node, at an assignment checking step 84. (If this is an advertisement packet whose sending node was the receiving node itself, the receiving node simply removes the packet from the ring at step 56, as described above.) As long as the assignments correspond correctly, the receiving node forwards the advertisement packet on to the next node on the ring without change, at a packet forwarding step 86. If the assignments indicated by the advertisement packet conflict with those of the receiving node, however, the receiving node, which is in the normal state, discards the packet, at a discard step 88.

For all other RPR control messages that a node receives, which are determined not to be advertisement packets at step 82, the node preferably checks the Ring ID bit or other flag to verify that the configuration of the MAC interface that received the message corresponds correctly to the Ring ID of the packet, at a correspondence checking step 89. Typically, the Ring ID will correspond correctly to the interface configuration, and the receiving node will handle the message using normal RPR protocol procedures, at a normal handling step 90.

When there is a mismatch between the Ring ID and the current interface configuration, the receiving node checks the sender address of the problematic packet, at an address checking step 92. When the sender address is higher than the MAC address of the interface that received the packet, the receiving node gives preference to its own interface configuration. In this case, the RPR message is treated as an invalid control packet, using normal fault handling procedures specified by RPR protocols, at step 90. On the other hand, if the sender address of the packet is lower than the address of the receiving node interface, the receiving node can conclude that its own configuration may be incorrect. In this case, the receiving node reconfigures its own interfaces based on the ring assignments in the received packet. It then enters the verification state in order to verify that its new ring assignments are now correct, at a repeat verification step 94. From this point on, the verification procedure continues from step 48 (FIG. 3A), as described above.

The methods and devices described herein are also useful in situations in which an existing network is reconfigured. For example, when two independent ring networks are combined (by the operator) into a single ring network, the operator or technician may cross the inner fiber of one network with the outer fiber of the other network. The protocol described above enables the nodes in the combined network to identify the mismatch and to automatically reconfigure their interfaces, preferably according to the configuration of the node with the lowest MAC address.

Although preferred embodiments are described hereinabove with specific reference to certain network types and protocols, and to certain fields and parameters used in these protocols, the principles of the present invention are applicable generally to bidirectional ring networks, and may be adapted to operate in conjunction with other communication protocols. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for configuration of a node inserted into a bidirectional ring network, after first and second network interfaces of the node are connected to respective first and second rings of the network, the method comprising:
- responsive to traffic on the first and second rings, determining at the node that one of the first and second rings carries the traffic in a clockwise direction around the network, while the other of the rings carries the traffic in a counterclockwise direction;
- sending and receiving advertisement packets through the first and second network interfaces over the respective rings, advertising the determined directions of the traffic carried by the rings; and
- responsive to the advertisement packets received at the node, completing the configuration of the node so that the traffic can be sent to and from the node on the first and second rings in the determined directions.

2. A method according to claim 1, wherein determining that the rings carry the traffic in the clockwise and counterclockwise directions comprises monitoring control packets passing the node on the first and second rings to determine the directions.

3. A method according to claim 2, wherein monitoring the control packets comprises reading a ring identification field in the control packets.

4. A method according to claim 2, wherein monitoring the control packets comprises receiving control packets that are transmitted in accordance with a Resilient Packet Ring (RPR) protocol.

5. A method according to claim 2, wherein determining that the rings carry the traffic in the clockwise and counterclockwise directions comprises, when the control packets are not received at the node within a predetermined timeout period, selecting the directions autonomously at the node.

6. A method according to claim 1, wherein sending and receiving the advertisement packets comprises putting the node in a verification state, in which it is not permitted to send or receive the traffic other than the advertisement packets, until the configuration of the node is completed.

7. A method according to claim 1, wherein completing the configuration comprises sending further advertisement packets indicating that the node has entered a normal state in which the traffic can be sent to and from the node on the first and second rings in the determined directions.

8. A method according to claim 1, wherein receiving the advertisement packets comprises receiving one of the advertisement packets sent by the node itself, after the one of the advertisement packets has made a complete circuit of one of the rings.

9. A method according to claim 1, wherein the node is a first node among a plurality of nodes in the network, and wherein receiving the advertisement packets comprises receiving an incoming advertisement packet sent by a second node among the nodes in the network.

10. A method according to claim 9, wherein completing the configuration comprises, when the incoming advertisement packet advertises directions of the traffic carried by the rings that are different from the directions determined at the first node, deciding whether to configure the interfaces according to the directions determined at the first node or the directions advertised by the second node, so that the interfaces at both the first and second nodes are configured according to the same directions.

11. A method according to claim 10, wherein each of the nodes in the network has a unique identification parameter, and wherein deciding whether to configure the interfaces comprises determining the configuration responsive to a comparison of the unique identification parameters of the first and second nodes.

12. A method according to claim 10, wherein receiving the incoming advertisement packet comprises, upon deciding to configure the interfaces according to the directions determined at the first node, discarding the incoming advertisement packet.

13. A method according to claim 10, wherein receiving the incoming advertisement packet comprises, upon deciding to configure the interfaces according to the directions determined at the first node, modifying the incoming advertisement packet so that it advertises the directions determined at the first node, and forwarding the modified packet around the network.

14. A method for configuration of a first node inserted into a bidirectional ring network, after first and second network interfaces of the first node are connected to respective first and second rings of the network, the method comprising:
- selecting at the first node one of the first and second rings to carry the traffic in a clockwise direction around the network, while selecting the other of the rings to carry the traffic in a counterclockwise direction;
- sending an outgoing advertisement packet from the first node through at least one of the first and second network interfaces over the respective ring, advertising the selected directions of the traffic carried by the rings and specifying a unique identification parameter of the first node;
- receiving an incoming advertisement packet at the first node from a second node in the network, in which the advertised directions of the traffic carried by the rings differ from the selected directions, the incoming advertisement packet specifying the unique identification parameter of the second node; and
- responsive to a comparison of the unique identification parameters of the first and second nodes, deciding whether to configure the interfaces of the first node according to the directions selected by the first node or the directions advertised by the second node.

15. A method according to claim 14, wherein the unique identification parameters of the first and second nodes comprise respective network addresses of the nodes.

16. A method according to claim 14, wherein the unique identification parameters of the first and second nodes comprise respective random numbers selected by the nodes.

17. A method according to claim 14, wherein deciding to configure the interfaces comprises choosing the directions according to which of the first and second nodes has a lesser value of the unique identification parameter.

18. A communication device, for operation as a node in a bidirectional ring network, the device comprising:
- first and second network interfaces, which are adapted to be connected to respective first and second rings of the network; and
- a traffic processor, coupled to the first and second network interfaces, which is adapted, responsive to traffic on the first and second rings, to determine that one of the first and second rings carries the traffic in a clockwise direction around the network, while the other of the rings carries the traffic in a counterclockwise direction, and which is further adapted to send and receive advertisement packets through the first and second network interfaces over the respective rings, advertising the determined directions of the traffic carried by the rings, and responsive to the advertisement packets received at the interfaces, to complete the configuration of the node so that the traffic can be sent to and from the node on the first and second rings in the determined directions.

19. A device according to claim 18, wherein the traffic processor is adapted to monitor control packets passing through the interfaces on the first and second rings to determine the directions.

20. A device according to claim 19, wherein the traffic processor is adapted to determine the directions by reading a ring identification field in the control packets.

21. A device according to claim 19, wherein the control packets are transmitted in accordance with a Resilient Packet Ring (RPR) protocol.

22. A device according to claim 19, wherein the traffic processor is adapted, when the control packets are not received at the node within a predetermined timeout period, to select the directions autonomously.

23. A device according to claim 18, wherein while sending and receiving the advertisement packets, the traffic processor maintains the node in a verification state, in which it is not permitted to send or receive the traffic other than the advertisement packets, until the configuration of the node is completed.

24. A device according to claim 18, wherein the traffic processor is adapted, upon completing the configuration, to send further advertisement packets indicating that the node has entered a normal state in which the traffic can be sent to and from the node on the first and second rings in the determined directions.

25. A device according to claim 18, wherein the traffic processor is adapted to complete the configuration of the node upon receiving one of the advertisement packets sent from the node itself, after the one of the advertisement packets has made a complete circuit of one of the rings.

26. A device according to claim 18, wherein the node is a first node among a plurality of nodes in the network, and wherein the traffic processor is adapted to complete the configuration of the node upon receiving an incoming advertisement packet sent by a second node among the nodes in the network.

27. A device according to claim 26, wherein the traffic processor is adapted to decide, when the incoming advertisement packet advertises directions of the traffic carried by the rings that are different from the directions determined at the first node, whether to configure the interfaces according to the directions that the traffic processor has determined or according to the directions advertised by the second node, so that the interfaces at both the first and second nodes are configured according to the same directions.

28. A device according to claim 27, wherein each of the nodes in the network has a unique identification parameter, and wherein the traffic processor is adapted to decide on the configuration responsive to a comparison of the unique identification parameters of the first and second nodes.

29. A device according to claim 27, wherein the traffic processor is adapted, upon deciding to configure the interfaces according to the directions that it has determined, to discard the incoming advertisement packet.

30. A device according to claim 27, wherein the traffic processor is adapted, upon deciding to configure the interfaces according to the directions that it has determined, to modify the incoming advertisement packet so that it advertises the directions determined at the first node, and to forward the modified packet around the network.

31. A communication device, for operation as a first node in a bidirectional ring network, the device comprising:

first and second network interfaces, which are adapted to be connected to respective first and second rings of the network; and a traffic processor, coupled to the first and second network interfaces, which is adapted to select one of the first and second rings to carry the traffic in a clockwise direction around the network, while selecting the other of the rings to carry the traffic in a counterclockwise direction, and which is further adapted to send an outgoing advertisement packet through at least one of the first and second network interfaces over the respective ring, advertising the selected directions of the traffic carried by the rings and specifying a unique identification parameter of the first node, and to receive an incoming advertisement packet through one of the first and second interfaces from a second node in the network, in which the advertised directions of the traffic carried by the rings differ from the selected directions, the incoming advertisement packet specifying the unique identification parameter of the second node, and which is adapted, responsive to a comparison of the unique identification parameters of the first and second nodes, to decide whether to configure the interfaces of the first node according to the directions selected by the first node or the directions advertised by the second node.

32. A device according to claim 31, wherein the unique identification parameters of the first and second nodes comprise respective network addresses of the nodes.

33. A device according to claim 31, wherein the unique identification parameters of the first and second nodes comprise respective random numbers selected by the nodes.

34. A device according to claim 31, wherein the traffic processor is adapted to choose the directions according to which of the first and second nodes has a lesser value of the unique identification parameter.

* * * * *